(12) United States Patent
Rahim

(10) Patent No.: US 6,572,790 B2
(45) Date of Patent: Jun. 3, 2003

(54) CATHODE COATING DISPERSION

(75) Inventor: Marufur Rahim, Fort Gratiot, MI (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 172 days.

(21) Appl. No.: 09/757,210

(22) Filed: Jan. 9, 2001

(65) Prior Publication Data

US 2002/0148107 A1 Oct. 17, 2002

(51) Int. Cl.[7] .............................. H01B 1/04; H01C 1/04; H01M 4/86; H01M 2/16; H01M 4/62
(52) U.S. Cl. .......................... 252/502; 429/40; 429/42; 429/137; 429/232
(58) Field of Search ................................ 429/163, 131, 429/232, 236, 40, 42, 136, 137; 252/502

(56) References Cited

U.S. PATENT DOCUMENTS

| | | | |
|---|---|---|---|
| 3,343,995 A | | 9/1967 | Reid et al. |
| 3,751,301 A | * | 8/1973 | Kilduff .................. 429/228 |
| 3,876,900 A | * | 4/1975 | Amatsuka et al. .......... 313/510 |
| 4,407,914 A | * | 10/1983 | Inoue et al. ............... 429/174 |
| 4,513,060 A | | 4/1985 | Vasta ..................... 428/416 |
| 4,578,286 A | | 3/1986 | Vasta ..................... 427/327 |
| 4,589,999 A | | 5/1986 | Vasta ..................... 252/511 |
| 4,810,600 A | | 3/1989 | Periard et al. ............. 429/224 |
| 5,041,199 A | * | 8/1991 | Di Franco ................ 204/181.5 |
| 5,665,212 A | * | 9/1997 | Zhong et al. .............. 304/297 |
| 6,013,379 A | * | 1/2000 | Uesugi et al. ............. 428/623 |
| 6,315,926 B1 | * | 11/2001 | Jansen .................... 252/500 |

FOREIGN PATENT DOCUMENTS

| | | |
|---|---|---|
| JP | 75000102 | * 12/1968 |
| JP | 74047099 | 12/1974 |
| JP | Sho 56-109261 | 8/1981 |

OTHER PUBLICATIONS

Polymers, Property Database. Copyright CRC Press, LLC, 2000, Section titled "Epoxy Rings".*

* cited by examiner

Primary Examiner—Patrick Ryan
Assistant Examiner—Julian Mercado
(74) Attorney, Agent, or Firm—Charles W. Almer

(57) ABSTRACT

This invention relates to a graphite and/or carbon black-containing cathode coating dispersion which is suitable for battery production. The dispersion is water, acid and alkali resistant and also electrically conductive when coated on cathode surfaces. The dispersion is a water-based system which contains a binder which is an epoxy resin and is cured with an amine curative. The dispersion is maintained as a two-pot compound wherein the epoxy dispersion is mixed with an amine curative at the time of application. The epoxy resins are preferably a Bisphenol A or Bisphenol F Epichlorohydrin based epoxy or epoxy novalac.

22 Claims, No Drawings

CATHODE COATING DISPERSION

FIELD OF THE INVENTION

This invention relates to a cathode coating dispersion containing graphite and/or carbon black and a resin epoxy which is suitable for use in batteries, fuel cells or capacitors.

BACKGROUND OF THE INVENTION

Alkali battery dry cells are manufactured by pre-forming a steel can and then nickel plating the inside of the can. Molded rings made from the cathode materials, generally containing a mixture of manganese dioxide, graphite and potassium hydroxide, are tightly fitted inside the can. The inside of the can is treated with a conductive dispersion which is placed between the inside surface of the can and the molded rings in order to improve the electrical contact between the can and the rings and to prevent corrosion of the nickel layer and the can.

Various emulsions have been utilized in an attempt to maximize electrical contact and prevent corrosion in batteries. These emulsions generally contain graphite and/or carbon black in combination with a binder. For example, U.S. Pat. No. 4,810,600 utilizes a dispersion containing graphite and/or carbon black in combination with a binder of a) vinyl acetate and ethylene, b) vinyl acetate and vinyl chloride, c) styrene and butadiene, or d) vinyl acetate, vinyl chloride and ethylene. In addition, other dispersions have been utilized containing binders of aromatic polyurethane, styrene acrylic, aliphatic polyester polyurethane, vinyl acetate acrylic, aliphatic polycarbonate urethane and fluoropolymer. All of these various dispersions exhibited some form of failure when subjected to high concentrations of potassium hydroxide. The dispersions all showed high resistance after the KOH test as opposed to before the test and in some cases the binders either became soft or lost adhesion when sprayed on the nickel plated panel, dried at 80° C. for 20 minutes and then immersed in 40% KOH solution for 72 hours at 80° C.

Accordingly, it is an objective of the present invention to provide a graphite-containing cathode dispersion for batteries which will improve the storage and discharge properties and form an electrically conductive polymer. The improved properties, such as adhesion, should occur when the dispersion is subjected to potassium hydroxide and/or elevated temperatures. It is a further objective to provide a dispersion which may be utilized on the bipolar plates of a fuel cell or as a current collector of bipolar electrodes used in an ultracapacitor.

SUMMARY OF THE INVENTION

This invention relates to a graphite and/or carbon black-containing cathode coating dispersion which is suitable for battery production. The dispersion is water, acid and alkali resistant and also electrically conductive when coated on cathode surfaces. The dispersion is a water-based system which contains a binder which is an epoxy resin and is cured with an amine curative. The dispersion is maintained as a two-pot compound wherein the epoxy dispersion is mixed with an amine curative at the time of application. The epoxy resins are preferably a Bisphenol A or Bisphenol F Epichlorohydrin based epoxy or epoxy novalac.

DETAILED DESCRIPTION OF THE INVENTION

The dispersion of the present invention comprises a graphite black and/or carbon which contains a binder. The dispersion is primarily utilized for coating a cathode holder or battery can. The coating in the alkaline battery comes in contact with an alkaline environment and the two-component coating of the present invention is extremely resistant to that alkaline condition. In addition, the dispersion is suited for application to the bipolar plates of a fuel cell. These plates are utilized in acidic conditions at temperatures ranging from 80–100° C. The bipolar electrodes in the fuel cell require very low electrical resistance at the interface. The cured graphite dispersion on the electrodes offers low resistance and the anticorrosive nature of the coating helps the electrodes function in the aqueous acidic environment. Further, the dispersion is suited for use as a current collector of bipolar electrodes used in an ultracapacitor. The current collector acts as a connecting layer that improves the electrical contact between the electrode and the electrolyte, which may be aqueous or non-aqueous in nature.

Preferred graphites for use in the dispersion are natural or synthetic graphite of high purity and high crystallinity. In the dispersion mixture, the electrically conductive graphite is used in the amount of about 30–90% by weight of the total solid. To prepare the graphite and/or carbon black portion of the dispersion, the graphite and/or carbon black is dispersed in demineralized water. As desired to obtain the proper coating qualities, other additives may be included in the mixture. For example, defoamers, preservatives and/or dispersing agents may be utilized. Defoamers which may be utilized include BYK 022, BYK 019, BYK 24 (BYK-Chemie), DF 37, DF-40, DF 120, DF 70, DF-75, DF-58, DF 60, DF-62, DF 66, DF 574, DF 696 (Air Products & Chemicals, Inc.), Nalco 2300, Nalco 2305, Nalco 2302 (Rohm & Haas Co.), Triton CF-32 (BASF Corp.), L-62 (Witco), Coatsil 1300 (Condea Vista) and Alfol 8 alcohol. Preservatives which may be utilized include Busan 85, Busan 2024, Busan 1024 (Buckman Laboratories), Hyamine 10-X, Hyamine 2389 (Rohm & Haas Co.), Promexal X50 (Zeneca), Parmetol DF 18 (S&M Special Additives), Kathon 886 (Rohm & Haas Co.) and Nuosept 101 (Creanova). Dispersing agents which may be utilized include, Busperse 229 (Buckman Laboratories), Tamol N, Tamol 731, Tamol 850, Tamol SN Rohm & Haas Co.), Daxad 30–30, Daxad 11, Daxad 15, Daxad 19 (W&R Grace Co.), CT-136, CT 141, CT 151, CT 161, CT 171 (Air Products & Chemicals, Inc.), Disperbyk 182, Disperbyk 190 and Disperbyk 185 (BYK-Chemie). Wetting agents which may be employed include Tween 20 (Spectrum Quality Products), Orotan and Silwet L-7068 (Witco). Surfactants which may be utilized include 104A, 104B, 104DPM, 104E, 104H, 104NP and 104PA (Air Products & Chemicals, Inc.).

In a preferred embodiment, the additives comprise from about 0.05 to about 5% of the total formulation weight. In an especially preferred embodiment, a wetting agent may also be added to the mixture. The wetting agent is preferably added in the amount of about 0–5% of the total formulation weight. In addition, one or more surfactants may be added to the mixture in amounts of about 0.05–1% of the total weight of the mixture.

In order to form the dispersion, the graphite or carbon black is mixed with a binder which is an epoxy resin. Preferred epoxy resins are Bisphenol A or Bisphenol F Epichlorohydrin based epoxy or epoxy novalac. These resins are preferred because, in contrast to other resins, they are chemically inert in alkaline or acidic environments and they adhere well to metal substrates in harsh environments. In the dispersion, the epoxy resin should have the epoxy equivalent weight in the range of about 100–2000. The epoxy resin may be a single epoxy resin or a blend of low equivalent weight epoxy in the range of about 100–300 and high equivalent weight epoxy in the range of about 500–1000. In order to achieve the proper conductivity for the desired application, it is necessary to prepare the mixture with the proper ratio of graphite and/or carbon black to binder. For example, for use with battery cans the proper ratio of graphite and/or carbon black to binder is in the range of about 1 to 6, with a preferred range of about 1 to 4. The epoxy dispersion is made by dispersing the epoxy binder with the graphite and/or carbon black. The overall water content of the dispersion is preferably in the range of about 30–90% by weight and the graphite and/or carbon black mixture is preferably about 10–60% by dry mass weight.

The dispersion is prepared such that it will comprise a very stable, homogeneous mixture in the presence of all the additives and the binder. As prepared, the dispersion will have a viscosity in the range of about 50 to about 1200 cps. In addition, the dispersion exhibits both pseudoplasticity and thixotropic behavior.

A curing agent is added to the dispersion prior to use. The curing agent is preferably a polyamine curing system which may be either aliphatic or cycloaliphatic or aromatic polyamine. The amine may also be a blend of aliphatic and cycloaliphatic amine curatives. The amine equivalent weight is in the range of 100–400. Preferred curatives include Epicure DPW-6870, Epicure 8290-Y-60, Epicure 8292-Y-60, Epicure 8295-H-60, Epicure 8535-W-50, Epicure 8536-MY-60, Epicure 8537-WY-60, Epicure 8540-MY-60, Anquamide 360, Anquamide 401, Anquamide 419, Anquamide 456 (Air Products & Chemicals, Inc.), Beckopox EH 613 or Beckopox EH 623 (Vianova) or HZ 340 (Ciba Specialty Chemicals).

The invention may be better understood by reference to the following examples which are intended for purpose of illustration and are not to be construed as in any way limiting the scope of the present invention.

A masterbatch graphite dispersion is created by mixing the graphite with water and the additives. The epoxy resin and the additives are added to the masterbatch and dispersed in a high-speed dispersion for about 30 minutes. Water is added as needed to obtain the appropriate viscosity.

| Masterbatch graphite | |
|---|---|
| Carbon black (Vulcan XC-72 pellets) | 3.980 grams |
| Cellulose | 0.91 |
| Preservative | 0.31 |
| Defoamer | 0.21 |
| Dispersion Agent | 0.55 |
| Demineralized Water | 66.93 |
| Synthetic Graphite (graphite 39 powder) | 27.11 |
| | 100.00 grams |

| EXAMPLE 1 (Part A) | |
|---|---|
| Bisphenol A Epichlorohydrin Based epoxy (EPI-REZ 5522-WY-55) | 18.69 grams |
| Masterbatch graphite | 70.51 |
| Water | 10.62 |
| Defoamer | 0.21 |

| | |
|---|---|
| | 100.00 grams |
| EXAMPLE 2 (Part A) | |
| Araldite PZ 3901 | 17.03 grams |
| Masterbatch graphite | 75.30 |
| Water | 10.00 |
| Defoamer | 0.15 |
| | 100.00 grams |
| EXAMPLE 1 and 2 (Part B) | |
| Aliphatic or cycloaliphatic Polyamine (80% solid) Beckopox EH 613 or EH 623 | 1.80 or 2.30 g |

Parts A and B are thoroughly mixed together in a disperser to produce a dispersion with a viscosity in the range of 260–340 cps. The pot life of the resulting dispersion is at least about 2–48 hours. The coating is then applied to the desired surface via pouring, brushing, spraying or dipping. The coating may be cured at room temperature or at elevated temperature. Thus, the water may be removed by allowing it to dry, by warming or by application of a vacuum. A preferred curing temperature is within the range of about 40–10000. After curing, a mechanically and chemically resistant, electrolyte insoluble protective film remains on the surface. The resistivity of the resulting coating is about 5–100 ohm per square mil. The amount of coating to be applied is selected so that the film thickness of the resulting protective film after evaporation of the water is preferably about 5–200 microns and most preferably about 20–100 microns. A uniform thickness is obtained via the pseudo-plastic and thixotropic properties of the dispersion.

The resulting coatings from Examples 1 and 2 were sprayed on nickel-plated panels and cured at 80° C. for 10–20 minutes. The nickel-plated panel was then placed in a 40% KOH solution for 72 hours at 80° C. The panels were then removed from the solution, washed with running water and then dried in an oven for 30 minutes at 60° C. A tape test was performed wherein Scotch brand tape was firmly pressed onto each sample and then slowly removed at a 90 degree angle. Excellent adhesion was shown by each sample in that none of the coating was removed via the tape test.

While the invention has been described with particular reference to certain embodiments thereof, it will be understood that changes and modifications may be made by those of ordinary skill within the scope and spirit of the following claims.

What is claimed is:

1. A coating dispersion for coating a battery or fuel cell, comprising graphite, carbon black or a mixture thereof, and a binder, wherein the coating dispersion is applied as a homogeneous aqueous dispersion which forms a protective film on the battery, or fuel cell, and wherein the binder is an epoxy resin comprising Bisphenol A, Bisphenol F Epichlorohydrin, epoxy novalac or mixtures thereof and is cured with an amine curative, and wherein the dispersion does not have an altered resistance after exposure to 40% KOH solution for a period of 72 hours at 80° C.

2. The coating dispersion of claim 1, wherein the ratio of graphite, carbon black or the mixture thereof to binder is in the range of about 1 to 6.

3. The coating dispersion of claim 2, wherein the dispersion has a water content between about 30–90% by weight and a dry mass content between about 10–70% by weight.

4. The coating dispersion of claim 2, wherein the dispersion has a water content between about 30–90% by weight and a dry mass content between about 10–60% by weight.

5. The coating dispersion of claim 4, wherein the graphite, carbon black or mixture thereof content of the dry mass is between about 10–60% by weight.

6. The coating dispersion of claim 5, wherein the dispersion additionally contains one or more defoamers, preservatives, dispersing agents, wetting agents, surfactants or mixtures thereof.

7. The coating dispersion of claim 6, wherein the one or more defoamers, preservatives, dispersing agents, wetting agents, surfactants or mixtures thereof comprise between about 0.05–5% by weight.

8. The coating dispersion of claim 6, wherein the dispersion contains about 0–5% by weight of a wetting agent.

9. The coating dispersion of claim 6, wherein the dispersion contains about 0.05–1% by weight of a surfactant.

10. The coating agent of claim 1, wherein the curing agent is a polyamine curing system.

11. The coating dispersion of claim 10, wherein the polyamine curing system comprises an aliphatic, cycloaliphatic or aromatic polyamine or mixtures thereof.

12. The coating dispersion of claim 11, wherein the amine equivalent weight of the curing system is in the range of about 100–400.

13. The coating dispersion of claim 12, wherein the dispersion has a viscosity of between about 50–1200 cps.

14. The coating dispersion of claim 11, wherein the dispersion shows a pseudoplastic and thixotropic behavior.

15. The coating dispersion of claim 14, wherein the binder has an epoxy equivalent weight in the range of about 100–2000.

16. The coating dispersion of claim 15, wherein the epoxy comprises a blend of a low equivalent weight epoxy and a high equivalent weight epoxy.

17. The coating dispersion of claim 15, wherein the epoxy comprises a single epoxy resin.

18. The coating dispersion of claim 1, wherein the protective film has a conductivity in the range of about 5 to 100 ohm per square mil.

19. An alkaline battery containing an electrically conductive protective film which is about 5 to 200 microns thick and has an electrical conductivity in the range of about 5 to 100 ohm per square mil, deposited from the coating dispersion of claim 1.

20. An alkaline battery containing an electrically conductive protective film which is about 20 to 100 microns thick and has an electrical conductivity in the range of about 20 to 100 ohm per square mill, deposited from the coating dispersion of claim 1.

21. A fuel cell containing an electrically conductive protective film that is about 5 to 200 microns thick and has an electrical conductivity in the range of about 5 to 100 ohm per square mil, deposited from the coating dispersion of claim 1.

22. A fuel cell containing an electrically conductive protective film which is about 20 to 100 microns thick and has an electrical conductivity in the range of about 20 to 100 ohm per square mil, deposited from the coating dispersion of claim 1.

* * * * *

UNITED STATES PATENT AND TRADEMARK OFFICE
CERTIFICATE OF CORRECTION

PATENT NO.    : 6,572,790 B2
DATED         : June 3, 2003
INVENTOR(S)   : Marufur Rahim It is certified that error appears in the above-identified patent and that said Letters Patent is hereby corrected as shown below:

Column 4,
Line 27, "40-10000" should read as -- 40-200 C --.

Signed and Sealed this

Twelfth Day of August, 2003

JAMES E. ROGAN
*Director of the United States Patent and Trademark Office*